No. 791,212. PATENTED MAY 30, 1905.
J. RAMSEY.
FRIED CAKE STRAINER.
APPLICATION FILED OCT. 24, 1904.
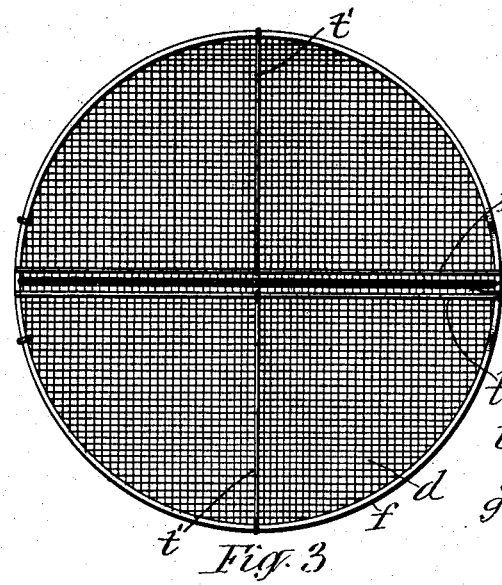
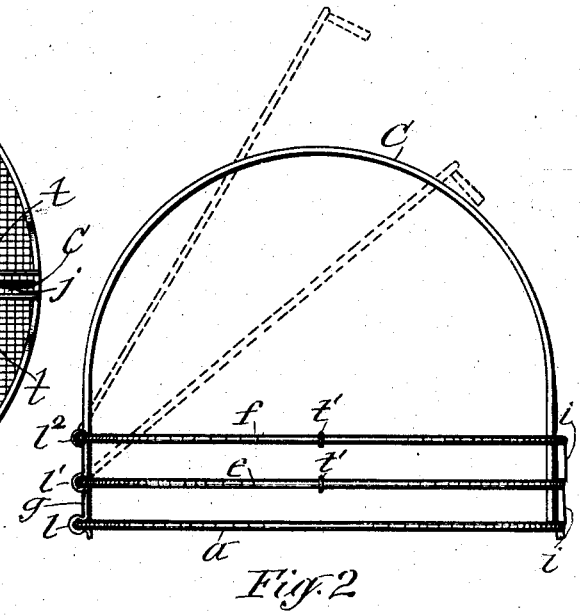
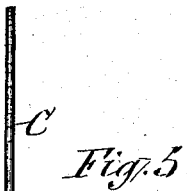
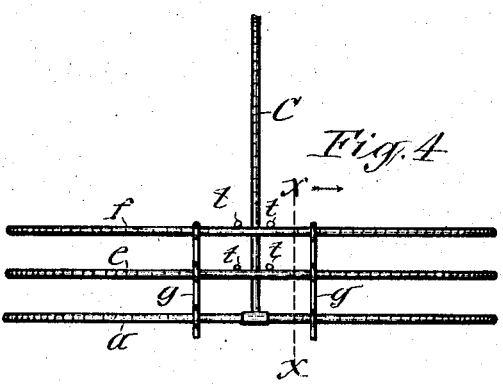
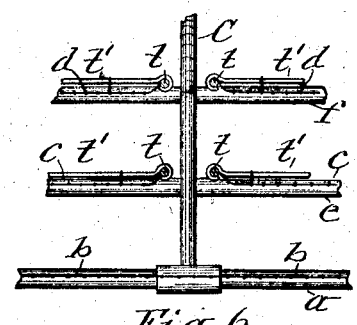
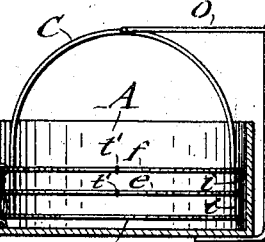
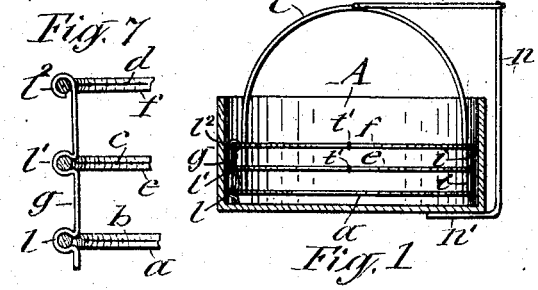
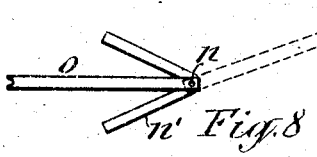
WITNESSES:
INVENTOR
John Ramsey
By E. Laas
his ATTORNEY.

No. 791,212. Patented May 30, 1905.

UNITED STATES PATENT OFFICE.

JOHN RAMSEY, OF SYRACUSE, NEW YORK.

FRIED-CAKE STRAINER.

SPECIFICATION forming part of Letters Patent No. 791,212, dated May 30, 1905.

Application filed October 24, 1904. Serial No. 229,742.

*To all whom it may concern:*

Be it known that I, JOHN RAMSEY, of Syracuse, in the county of Onondaga, in the State of New York, have invented new and useful Improvements in Fried-Cake Strainers, of which the following, taken in connection with the accompanying drawings, is a full, clear, and exact description.

The object of this invention is to provide inexpensive, convenient, and efficient means for maintaining submerged in a kettle of boiling lard the cakes to be fried therein, and thus preventing the said cakes from cracking and becoming saturated with lard during the process of frying them; and to that end the invention consists in the novel construction and combination of the component parts of the fried-cake strainer herein described, and illustrated in the accompanying drawings, in which—

Figure 1 is a vertical transverse section of a kettle with my improved fried-cake strainer applied thereto. Fig. 2 is an enlarged side view of the fried-cake strainer removed from the kettle. Fig. 3 is a plan view of the same. Figs. 4 and 5 are elevations of opposite sides thereof. Fig. 6 is a further enlarged fragmentary elevation showing the attachment of the bail to the base-frame. Fig. 7 is an enlarged transverse section on the line X X in Fig. 4 viewed in the direction of the dart, and Fig. 8 is a top plan view of the standard and arm employed for preventing the fried-cake strainer from being lifted from the bottom of the kettle by the buoyancy imparted to the cakes in the process of baking them.

A represents a kettle in which the cakes are fried in boiling lard. These cakes have a tendency to rise to the surface of the boiling lard, and the resultant exposure of said cakes to the air causes the cakes to crack and become soaked with lard, and thus impair their quality and taste. To obviate this defect, I employ my improved fried-cake strainer, which apparatus maintains the cakes submerged in the boiling lard in the kettle and is constructed as follows:

$a$ denotes the base-frame of the said apparatus, which frame is formed of strong wire bent circular and united at its ends.

$b$ is a circular-shaped reticular strainer, preferably formed of wire-netting, which spans the base-frame $a$ and is suitably fastened thereto.

$c$ and $d$ represent superposed reticular strainers, the uppermost of which constitutes the cover of the apparatus. These superposed strainers are attached to annular wire frames $e\,f$, which are of the same diameter as the base-frame $a$ and are hinged at different elevations to posts $g\,g$, fastened to the frame $a$ at one side of the periphery thereof. I preferably form each of said posts of a metal bar or heavy wire bent into loops $h\,h'\,h^2$, the bottom one of which embraces the wire of the base-frame $a$. The superposed wire frames $e\,f$ pass loosely through the loops $l'\,l^2$, respectively, and are thus hinged to the post $g$. Diametrically opposite the said posts are props $i\,i$, formed on the frames $e\,f$ to support the free edges of said frames.

The superposed strainers $c\,d$ are formed with coinciding slots $j$, which extend across the centers thereof to accommodate the bail C, which is fastened at its ends to the base-frame $a$ and passes through the slots $j\,j$ to a sufficient distance from the top of the kettle A to render it convenient of access for lifting the described apparatus out of the kettle and removing the fried cakes from the strainers $b\,c\,d$.

$t\,t$ are stiff wire rods, which extend parallel across the centers of the superposed strainers $c\,d$ and are fastened to the frames $e\,f$ of said strainers. The rods $t$ form the slot $j$ between them and have the inner edges of the semicircular sections of the strainers attached to them.

$t'\,t'$ are wire rods, which are attached at one end to the rods $t\,t$ at about midway their lengths and extend at right angles therefrom to the strainer-frames $e\,f$ and are fastened there to brace the rods $t\,t$.

$n$ represents a standard, which is formed with a foot $n'$, by means of which it engages the bottom of the kettle A, as shown in Fig. 1 of the drawings. To the upper end of this standard is pivoted a horizontally-sustained arm $o$, which is adapted to be swung into position to engage at its free end the top of the bail C, so as to confine the described fried-cake strainer on the bottom of the interior of the kettle during the process of frying the cakes, as hereinbefore stated.

In using my described apparatus the operator removes it from the kettle, and after placing it upon a table or bench he lifts the free edges of the strainers *e* and *f* from the bottom strainer *a*, as indicated in dotted lines in Fig. 2 of the drawings. He then places upon the bottom strainer *a* a sufficient quantity of raw cakes to lie evenly thereon, then brings down the next superposed strainer *e* so as to lie horizontally over the cakes on the bottom strainer *a*. He then disposes upon the said superposed strainer *e* a layer of raw cakes and brings down over the latter the top strainer or reticulated cover *f*. The apparatus thus prepared is then placed in a kettle A of boiling lard, and in case said apparatus is sufficiently light to allow it to be lifted by the buoyancy imparted to the cakes in the process of frying them the standard *n* is placed upright at the exterior of the kettle A and sustained in position by the foot *n'* of the standard engaging the under side of the kettle. Then the arm *o* on the said standard is swung into position to bear on top of the bail C of the apparatus, as shown in Fig. 1 of the drawings.

What I claim as my invention is—

1. The combination with the base-frame and reticular strainer attached to said frame, of posts attached to said frame at one side of the periphery thereof, a plurality of superposed reticular strainers hinged to said posts and formed with coinciding slots extending across said superposed strainers, and a bail attached to the base-frame and passing through the aforesaid slots as set forth and shown.

2. The combination with the kettle, of a fried-cake strainer consisting of a base-frame seated in said kettle, a reticular strainer attached to said frame, posts attached to the frame at one side of the periphery thereof, a plurality of reticular strainers hinged to said posts at different elevations and provided with props diametrically opposite the posts and with coinciding slots extending across the strainers, a bail attached to the base-frame and passing through the aforesaid slots, a standard provided with a supporting-foot engaging the bottom of the kettle, and an arm pivoted at the top of the standard and adapted to bear on the top of the bail as and for the purpose set forth.

JOHN RAMSEY.

Witnesses:
J. J. LAASS,
L. H. FULMER.